United States Patent
Kumar et al.

(10) Patent No.: US 8,417,361 B2
(45) Date of Patent: Apr. 9, 2013

(54) MODEL PREDICTIVE CONTROL SYSTEM AND METHOD FOR INTEGRATED GASIFICATION COMBINED CYCLE POWER GENERATION

(75) Inventors: Aditya Kumar, Niskayuna, NY (US); Ruijie Shi, Niskayuna, NY (US); Rajeeva Kumar, Niskayuna, NY (US); Mustafa Dokucu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 317 days.

(21) Appl. No.: 13/053,731

(22) Filed: Mar. 22, 2011

(65) Prior Publication Data
US 2012/0245748 A1 Sep. 27, 2012

(51) Int. Cl.
*G05B 13/04* (2006.01)

(52) U.S. Cl. .......................................... 700/44; 700/288

(58) Field of Classification Search .................. 700/28, 700/29, 33, 44, 288
See application file for complete search history.

(56) References Cited

U.S. PATENT DOCUMENTS

| | | | |
|---|---|---|---|
| 6,269,286 B1 | 7/2001 | Tse et al. | |
| 7,050,863 B2 * | 5/2006 | Mehta et al. | 700/29 |
| 7,376,472 B2 * | 5/2008 | Wojsznis et al. | 700/29 |
| 7,608,938 B2 | 10/2009 | Anrew et al. | |
| 7,904,282 B2 * | 3/2011 | Goebel et al. | 703/7 |
| 8,265,777 B2 * | 9/2012 | Liu et al. | 700/31 |
| 2004/0123600 A1 | 7/2004 | Brunell et al. | |
| 2005/0193739 A1 | 9/2005 | Brunell et al. | |
| 2007/0289216 A1 | 12/2007 | Tsangaris et al. | |
| 2009/0292436 A1 | 11/2009 | D'amato et al. | |
| 2010/0138004 A1 | 6/2010 | Chia et al. | |
| 2010/0146858 A1 | 6/2010 | Zamansky et al. | |
| 2010/0275781 A1 | 11/2010 | Tsangaris et al. | |
| 2010/0302691 A1 | 12/2010 | Premerlani et al. | |
| 2011/0036096 A1 | 2/2011 | Bommareddy et al. | |

FOREIGN PATENT DOCUMENTS

| | | |
|---|---|---|
| JP | 2006046716 A | 2/2006 |
| WO | WO2010070288 A2 | 6/2010 |

OTHER PUBLICATIONS

Long, C.E., Gatzke, E.P. "Model Predictive Control Algorithm for Prioritized Objective Inferential Control of Unmeasured States Using Propositional Logic". Industrial & Engineering Chemistry Research 44 (2005): 3575-3584.*

Tan, K.C., Lee, T.H., Khor, E.F. "Evolutionary Algorithms with Goal and Priority Information for Multi-Objective Optimization". Proceeding of the 1999 Congress on Evolutionary Computation 1 (1999): 106-113.*

(Continued)

*Primary Examiner* — Ryan Jarrett
(74) *Attorney, Agent, or Firm* — Ann M. Agosti (57) ABSTRACT

Control system and method for controlling an integrated gasification combined cycle (IGCC) plant are provided. The system may include a controller coupled to a dynamic model of the plant to process a prediction of plant performance and determine a control strategy for the IGCC plant over a time horizon subject to plant constraints. The control strategy may include control functionality to meet a tracking objective and control functionality to meet an optimization objective. The control strategy may be configured to prioritize the tracking objective over the optimization objective based on a coordinate transformation, such as an orthogonal or quasi-orthogonal projection. A plurality of plant control knobs may be set in accordance with the control strategy to generate a sequence of coordinated multivariable control inputs to meet the tracking objective and the optimization objective subject to the prioritization resulting from the coordinate transformation.

25 Claims, 3 Drawing Sheets

OTHER PUBLICATIONS

Zhang et al., "Techno-Economic Feasibility of Highly Efficient Cost-Effect Thermoelectric-SOFC Hybrid Power Generation Systems", DOE Scientific and Technical Information, Sep. 30, 2007.

Simon, Dan, "Aircraft Turbofan Engine Health Estimation Using Constrained Kalman Filtering", Journal of Engineering for Gas Turbines and Power, Apr. 2005, vol. 127, p. 323-328.

Van Der Merwe, Rudolph, "Sigma-Point Kalman Filters for Non-Linear Estimation and Sensor-Fusion-Applications to Integrated Navigation", American Institute of Aeronautics and Astronautics, p. 1-30.

* cited by examiner

MODEL PREDICTIVE CONTROL SYSTEM AND METHOD FOR INTEGRATED GASIFICATION COMBINED CYCLE POWER GENERATION

STATEMENT REGARDING FEDERALLY SPONSORED DEVELOPMENT

This invention was made with government support under Contract No. DE-FC26-07NT43094, awarded by the United States Department of Energy. Accordingly, the United States Government may have certain rights in this invention.

CROSS-REFERENCE TO RELATED APPLICATIONS

This application is related to U.S. patent application Ser. No. 13/053,690, titled "Method And System To Estimate Variables In An Integrated Gasification Combined Cycle (IGCC) Plant", filed concurrently herewith and herein incorporated by reference in its entirety.

FIELD

The present invention is generally related to integrated gasification combined cycle (IGCC) power generation, and, more particularly, to model-based predictive control system and method for controlling an IGCC power generation plant.

BACKGROUND

Integrated Gasification Combined Cycle (IGCC) technology continues progressing as an attractive technology for clean and efficient electric power generation, such as may be generated from abundant carbonaceous materials, e.g., coal and other relatively low-cost fuels. At the front end of IGCC is a process known as gasification, which is a partial oxidation process that transforms the fuel (e.g., coal) into a stream of combustible synthesis gas (syngas). IGCC is environmental-friendly because pollution-causing emissions (e.g., $SO_x$, $NO_x$, mercury, particulates, etc.) may be substantially removed from the syngas stream before combustion occurs. While IGCC technology intrinsically holds significant potential for clean and efficient power generation, there are opportunities yet to be exploited to improve IGCC power generation for enhanced reliability, availability, efficiency and flexibility.

It is known that present techniques for operation of an IGCC power plant tend to be based on simplistic control procedures, as may be conveyed to an operator by way of rigid and cumbersome operator guidelines, not necessarily designed to achieve any meaningful optimization strategy, such as may be due to limited online information for monitoring and controlling the IGCC plant. For example, instead of relying on fundamental metrics, which may directly indicate actual physical performance of the plant, such as carbon conversion efficiency, etc., subordinate metrics, which may just tangentially indicate performance of the plant, such as oxygen-to-carbon ratio, are often substituted in an attempt to assess plant performance. Moreover, present plant operation relies on operators having to "tweak" single control knobs or dials (e.g., oxygen-to-carbon ratio) to achieve some basic operation, which may be subject to variability, as may be introduced due to the level of experience of a given operator. The foregoing approach generally results in a conservative (i.e., suboptimal control), which does not fully achieve the potential efficiency of the IGCC plant.

In view of the foregoing considerations, it would be desirable to formulate a model predictive control (MPC) strategy, where the IGCC plant may be cost-effectively operated with a higher degree of flexibility. For example, it would be desirable to formulate a multivariable predictive control strategy, which may be dynamically tailored essentially in real-time to a respective operational mode of the IGCC plant, or may be dynamically tailored to a respective transient condition of the IGCC plant, such as when the plant transitions from one operational mode to another operational mode. It would be further desirable to formulate a control strategy, which may be dynamically adaptable to various scenarios of plant operation, such as operation with different fuels or fuel blends, or under varying power generating conditions, while maintaining or improving efficiency and availability of the IGCC plant.

BRIEF DESCRIPTION

Generally, at least some aspects of the present invention may be fulfilled by a control system for an integrated gasification combined cycle (IGCC) power generation plant. The system may include a sensor suite coupled to sense a plurality of signals indicative of plant parameters. The system may further include an estimator coupled to receive at least some of the plant parameters sensed by the sensor suite and estimate at least a further plant parameter. A dynamic model may be coupled to the estimator and/or sensor suite to receive sensed and/or estimated plant parameters and generate a prediction of plant performance over a prediction time horizon. A controller may be coupled to the dynamic model to process the prediction of plant performance and determine a control strategy for the IGCC plant over a control time horizon subject to one or more constraints of the plant. The control strategy may include a control functionality to meet a tracking objective and may further include a control functionality to meet an optimization objective. The control strategy may be configured to prioritize the tracking objective over the optimization objective based on a coordinate transformation. A plurality of plant control knobs may be set in accordance with the determined control strategy to generate a sequence of coordinated multivariable control inputs configured to meet the tracking objective, and meet the optimization objective.

At least some additional aspects of the present invention may be fulfilled by a method to control an integrated gasification combined cycle (IGCC) power generation plant. The method may include the following actions: sensing a plurality of signals indicative of plant parameters; estimating at least a further plant parameter based on at least some of the sensed plant parameters; generating a prediction of plant performance over a prediction time horizon based on sensed and/or estimated plant parameters; processing the predicted plant performance to determine a control strategy over a control time horizon subject to one or more constraints of the plant; defining in the control strategy a control functionality to meet a tracking objective; defining in the control strategy a control functionality to meet an optimization objective; performing a coordinate transformation to prioritize the tracking objective over the optimization objective; and setting a plurality of plant control knobs in accordance with the determined control strategy to generate a sequence of coordinated multivariable control inputs configured to meet the tracking objective, and further configured to meet the optimization objective subject to the prioritization resulting from the coordinate transformation.

Still additional aspects of the present invention may be fulfilled by an integrated gasification combined cycle (IGCC)

power generation plant including a control system, which in turn may include a sensor suite coupled to sense a plurality of signals indicative of plant parameters. An estimator coupled to receive at least some plant parameters sensed by the sensor suite and estimate at least a further plant parameter. A dynamic model of the plant coupled to the sensor suit and/or estimator to receive sensed and/or estimated plant parameters and generate a prediction of plant performance over a prediction time horizon subject to one or more constraints of the plant. A controller may be to the dynamic model to process the prediction of plant performance and determine a control strategy for the IGCC plant, wherein the control strategy comprises a control functionality to meet a tracking objective and further comprises a control functionality to meet an optimization objective. The control strategy may be configured to prioritize the tracking objective over the optimization objective based on a coordinate transformation, such as an orthogonal projection or a quasi-orthogonal projection. A plurality of plant control knobs may be set in accordance with the determined control strategy to generate a sequence of coordinated multivariable control inputs, and meet the optimization objective subject to the prioritization resulting from the orthogonal projection or the quasi-orthogonal projection.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The inventors of the present invention propose an innovative and elegant control strategy comprising both online tracking and optimization, as may be applied in the context of an Integrated Gasification Combined Cycle (IGCC) power generation plant. The proposed control strategy is based on model predictive control (MPC), which uses online prediction using a physics-based dynamic model to perform a control strategy comprising both online tracking and optimization to achieve one or more desired performance objectives for the plant, subject to applicable constraints, such as physical (e.g., hardware) and/or operational constraints. As used herein, "tracking" refers to a functionality of the control strategy configured to meet a respective reference (e.g., target value) set for one or more objectives of the plant, such as meeting a target value of the net electric power output of the IGCC power plant, or meeting a ramping-up target rate to meet a peak transient load. "Optimization" refers to functionality of the control strategy involving minimization or maximization of one or more performance metrics of the IGCC power plant, e.g., maximization of carbon conversion, or minimization of oxygen consumption.

It will be shown that in accordance with aspects of the present invention, the control strategy may be configured so that the tracking performance is prioritized over the optimization performance. For example, meeting the target value of the net electric power output of the plant may be prioritized over the performance metric in connection with carbon conversion maximization, or meeting the ramping-up target rate may be prioritized over the performance metric in connection with minimization of oxygen consumption.

To perform this control strategy, a coordinate transformation (e.g., an orthogonal or quasi-orthogonal projection) is performed. For example, a vector indicative of the optimization objective may be projected on a subspace orthogonal or quasi-orthogonal to a vector indicative of the tracking objective. This implies that to perform the optimization objective one should have at least one excess degree of freedom present in the control inputs after meeting the tracking objective. In the example case of an orthogonal projection only excess degrees of freedom in the control inputs that have no impact on the tracking objective may be used for performing the optimization objective. In the example case of a quasi-orthogonal projection excess degrees of freedom in the control inputs that could have some impact on the tracking objective may be used for performing the optimization objective. If no such excess degrees freedom is available in the control inputs, then the optimization objective will not be performed. For readers desirous of general background information regarding vector spaces and matrix analysis, reference is made to Appendix A, "Review of Linear Algebra" of textbook titled "An Introduction to Linear Control Systems" by Thomas E. Fortmann and Konrad L. Hitz, copyright© 1977 by Marcel Dekker Inc.

In one example aspect, the proposed control strategy may be configured to flexibly achieve a desired objective depending on the operational mode of the plant. For example, at part-load steady state operation of the IGCC plant, the control strategy may be arranged to minimize oxygen consumption, while at baseload operation of the IGCC plant, the control strategy may be configured to maximize net electric power output. Similarly, during transient operational conditions of the IGCC plant, such as may occur when transitioning from part-load operation to baseload operation, the control strategy may be configured to meet relatively fast ramping rates, subject to applicable constraints, e.g. air separation unit (ASU) load rate, component strain limits, etc. In yet another aspect, the control strategy may be arranged to achieve a relatively seamless and efficient transition between different fuels or fuel blends, e.g., from coal to coal-petcoke blends or vice versa. Thus, it should be appreciated that a control strategy embodying aspects of the present invention may be dynamically configured to enable improved plant operation with substantial flexibility and efficiency.

Figure 1:
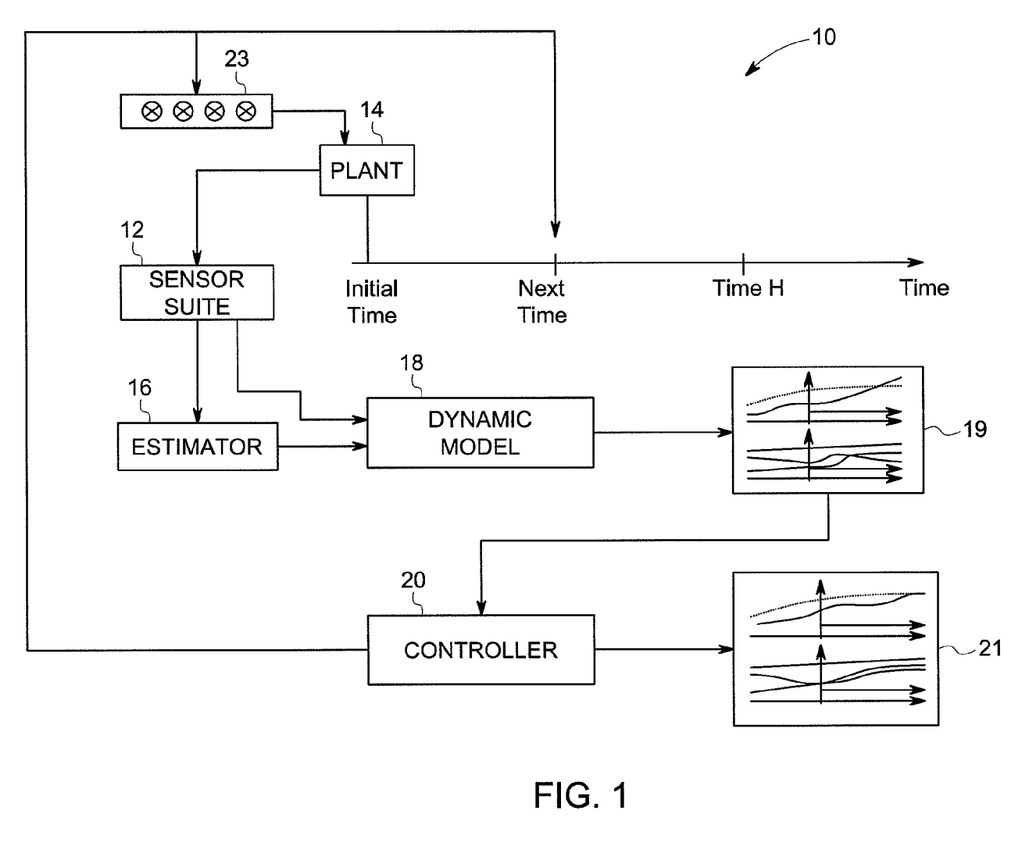
FIG. 1 is a block diagram representation of an example control system embodying aspects of the present invention, as may be used to perform a control strategy to control an Integrated Gasification Combined Cycle (IGCC) power plant.

FIG. 1 is a block diagram representation of an example control system 10 embodying aspects of the present invention. A sensor suite 12 may be arranged to sense a plurality of signals in a plant 14, which in one example embodiment may correspond to a gasification section of the IGCC plant. The sensed signals may be indicative of plant parameters. At least some of the parameters sensed by sensor suite 12 may be supplied to an estimator 16 to estimate at least one or more plant parameters. In one example embodiment estimator 16 may derive one or more further plant parameters based on straightforward mathematical operations of one or more of the plant parameters supplied by sensor suite 12. For example, a plant parameter, not directly supplied by sensor suite 12, may be derived by estimator 16 based on such mathematical operations. In one example embodiment, estimator 16 may comprise an extended Kalman filter (EKF), as may be used to estimate plant parameters and/or plant states.

A dynamic model 18 is coupled to receive the plant sensed and/or estimated parameters as may be respectively obtained from sensor suite 12 and/or estimator 16 to determine a prediction 19 of plant performance over a finite prediction time horizon relative to desired references for controlled outputs and limits on the constraint outputs over the prediction horizon. Dynamic model 18 is coupled to a controller 20 configured in accordance with aspects of the present invention to determine a control strategy 21 based on the model-based prediction. The control strategy may be implemented by way of a sequence of coordinated multivariable control inputs, as may be realized by a coordinated setting of a plurality of plant control knobs 23, which in one example embodiment may be set in automated fashion, or, in an alternative embodiment, could be set by way of an operator, as may be assisted by a computerized user-interface, such as graphical user interface (GUI) or any other suitable human-machine interface (HMI), or could be set in a semi-automated fashion, such as could involve both manual and automated settings. Although state estimator 16, dynamic model 18 and controller 20 are illustrated in FIG. 1 as separate processing blocks, it will be readily appreciated by one skilled in the art that such processing blocks may be integrated in a common processor.

Figure 2:
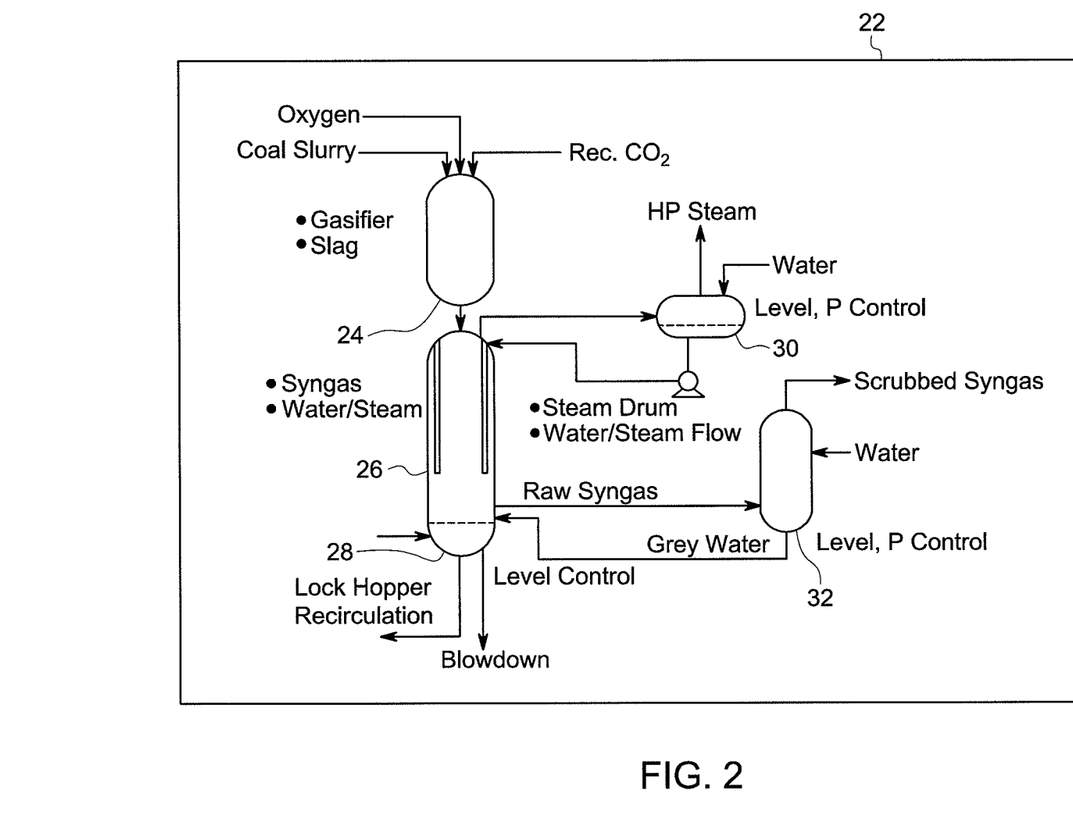
FIG. 2 is a simplified schematic model representation of an example gasification section of the IGCC plant, as may be simulated by a dynamic model, as may be part of the control system shown in FIG. 1.

FIG. 2 is a simplified schematic model representation of an example gasification section 22, as may be modeled by dynamic model 18. As will be readily appreciated by one skilled in the art, example model components of gasification section 22 may include a gasifier model component 24, a radiant syngas cooler (RSC) model component 26, a RSC quench model component 28, a high-pressure (HP) steam drum model component 30 and a scrubber model component 32. Example input model parameters received by gasifier model component 24 may be indicative of fuel input (e.g., coal slurry), recycled $CO_2$, and oxygen feed. Example output model parameters supplied by gasifier model component 24 may be gasifier outlet syngas composition and temperature, ash flow and carbon conversion. In one example embodiment, gasifier model component 24 was configured and tested to simulate a wide range of example operating condition variations, such as:

throughput changes ranging from approximately 50% to approximately 100%,
oxygen feed ratio changes ranging from approximately −5% to approximately +7%,
coal slurry water content variation ranging from −10% to +10%,
recycle $CO_2$ feed changes ranging from approximately 0% to approximately 100%,
percent petcoke content in coal-petcoke fuel blend ranging from approximately 0% to approximately 50%.

It will be appreciated that the foregoing operating condition variations should be construed in an example sense and not in a limiting sense being that dynamic model may be appropriately adapted to simulate the specific physical and/or operational aspects of any given application.

Example input parameters received by RSC model component 26 may be the syngas output stream from gasifier model component 26, and water/steam flow from HP steam drum model component 30 to, for example, calculate transient variation in the syngas temperature, a level of RSC tubing stress and the steam fraction in the water stream the RSC tubing. Quench model component 28 may receive as example input parameters the respective syngas and ash/slag streams from the RSC outlet to, for example, calculate a quench outlet syngas stream flow rate, composition and enthalpy. RSC model component 26 may be coupled to HP steam drum model component 30 to, for example, calculate a water/steam circulation flow rate between the HP stream drum and the RSC piping. In one example embodiment, HP steam drum model component 30 may be adapted to appropriately capture transients that may develop during the pressure ramp-up phase during startup. For example, appropriately capturing changes in drum level during pressure transients may be desirable, particularly during lower pressure conditions at startup, since the drum level may be subject to relatively tight constraint limits. Scrubber model component 32 may receive from quench model component 28 the quench syngas output and then calculate a scrubbed syngas composition and temperature. It will be appreciated that the foregoing model representation of gasification section 22 should be construed in an example sense and not in a limiting sense being that aspects of the present invention are neither limited to any specific modeling implementation for the gasification section of the IGCC plant nor to any specific gasification design.

In one example embodiment, dynamic model 18 comprises a reduced-order dynamic model of the gasification section suitable for online model prediction and optimization. In one example embodiment, a reduced-order model may be able to perform a simulation substantially faster (e.g., approximately at least a 1000 times faster) than a full-order model while maintaining a relatively high-level of accuracy. It will be appreciated that in a practical embodiment the faster simulation speed of the reduced-order model is desirable for real-time simulation and sensing and control design.

In one example embodiment, dynamic model 18 (e.g., gasification section 22 (FIG. 2)) may be mathematically represented by a differential-algebraic equation (DAE) model of the following general form:

$$\dot{x}=f(x,u,z,p)$$

$$0=g(x,u,z,p)$$

$$y_i=h_i(x,u,z,p), i \in \{c,t,o\} \qquad \text{Eq. 1}$$

In Eq. 1, x represents a vector of state variables for the differential equations, z represents a vector of algebraic variables with corresponding algebraic equations, u represents a vector of control inputs, p represents a vector of model parameters, and $y_c$, $y_t$, $y_o$ represent vectors of constraint, tracking and optimization outputs, respectively. Throughout this explanation, variables c, t, and o respectively represent constraint, tracking and optimization outputs. In one example embodiment, the foregoing DAE model may be of index one, i.e., the algebraic equations can be solved for the algebraic variables z to obtain an equivalent ordinary differential equation (ODE) model, which may be represented as follows:

$$\dot{x}=\bar{f}(x,u,p)$$

$$y_i=\bar{h}_i(x,u,p), i \in \{c,t,o\} \qquad \text{Eq. 2}$$

The above ODE model may be processed by controller 20 (FIG. 1) in discrete time, with a sample time $T_s$ to formulate and solve the MPC problem. By way of example, the processing may be performed at a present time sample k, starting from an initial condition $x_o$, and for a baseline input control profile represented by $\bar{u}$. The above ODE model may be processed over a desired prediction time horizon, $T_p=n_p*T_s$ (where $n_p$ indicates a number of samples in the prediction horizon for MPC), to obtain a resulting solution profile as may be represented by $\bar{x}^{k+j}$, $\bar{y}_{i,k+j}$ (j=0, 1, . . . , $n_p$). The dynamic model may be linearized about this baseline prediction profile and expressed in terms of a deviation from the baseline prediction profile as follows:

$$\dot{X} = AX + BU$$

$$Y_i = C_i X + D_i U, \; i \in \{c, t, o\} \quad \text{Eq. 3}$$

In Eq. 3, variables X, U, Y indicate deviations from the baseline prediction profile. In one example embodiment, the MPC control strategy may be formulated as a combination of reference tracking and optimization of the outputs $y_t$ and $y_o$, respectively as follows:

$$\min_{u_{k+j}} \frac{1}{2} \sum_{j=0}^{j=np} (r_{k+j} - Y_{t,k+j})^T Q (r_{k+j} - Y_{t,k+j}) + \quad \text{Eq. 4}$$

$$\frac{1}{2} \sum_{j=0}^{nc} \Delta U_{k+j}^T R \Delta U_{k+j} + \sum_{j=0}^{j=np} L^T Y_{o,k+j}$$

Eq. 4 is subject to appropriate constraints (e.g., magnitude and rate constraints) for the inputs and outputs, which may be represented as follows:

$$u_{min} \leq u_{k+j} \leq u_{max}$$

$$\Delta u_{min} \leq \Delta u_{k+j} \leq \Delta u_{max}$$

$$y_{c,min} \leq y_{c,k+j} \leq y_{c,max}$$

$$\Delta y_{c,min} \leq \Delta y_{c,k+j} \leq \Delta y_{c,max} \quad \text{Eq. 5}$$

In one example embodiment, the magnitude and rate constraints for the inputs may be imposed as hard constraints, while the magnitude and rate constraints for the outputs may be imposed as soft constraints using a positive slack variable s for each constraint output, and including quadratic and linear penalties on the slack variable, where Q and L represent weights respectively associated with the quadratic and linear penalties. Mathematical aspects in connection with such hard and soft constraints may be represented by Eqs. 4a and 5a below, which will be recognized as respective adaptations of Eqs. 4 and 5:

$$\min_{u_{k+j}} \frac{1}{2} \sum_{j=0}^{j=np} (r_{k+j} - Y_{t,k+j})^T Q (r_{k+j} - Y_{t,k+j}) + \quad \text{Eq. 4a}$$

$$\frac{1}{2} \sum_{j=0}^{nc} \Delta U_{k+j}^T R \Delta U_{k+j} + \sum_{j=0}^{j=np} L^T Y_{o,k+j} + \frac{1}{2} s^T Q_s s + L_s^T s \text{ where}$$

$$s = \begin{bmatrix} s_1 \\ s_2 \end{bmatrix}$$

$$u_{min} \leq u_{k+j} \leq u_{max} \quad \text{Eq. 5a}$$

$$\Delta u_{min} \leq \Delta u_{k+j} \leq \Delta u_{max}$$

$$y_{c,min} - s_1 \leq y_{c,k+j} \leq y_{c,max} + s_1$$

$$\Delta y_{c,min} - s_2 \leq \Delta y_{c,k+j} \leq \Delta y_{c,max} + s_2$$

$$0 \leq s_1$$

$$0 \leq s_2$$

The above control strategy, together with the linearized model described in Eq. 3, yields Eq. 6, which one skilled in the art will recognized as a classical quadratic programming (QP) problem, which may be solved using a numerical solution using techniques well-understood by one skilled in the art. This would yield a solution (e.g., optimum control action profile) for the optimization vector θ, which includes the control input sequence $u_{k+j}$ over a control time horizon as well as the slack variable s, subject to the constraints defined by the inequality below, which indicates that every entry of the vector Kθ is less than or equal to the corresponding entry of the vector M.

$$\min_{\theta} \frac{1}{2} \theta^T H \theta + c^T \theta \text{ where} \quad \text{Eq. 6}$$

$$\theta = \begin{bmatrix} \mathcal{U} \\ s \end{bmatrix} \text{ and } K\theta \leq M$$

Upon calculation and implementation of an initial optimal control sequence, iterative processing of the foregoing actions, e.g., model prediction, linearization and QP problem formulation, would yield respective control solutions performed at each time sample k. To enable flexibility in the control strategy the weights Q and L corresponding to the tracking and optimization outputs may be adjusted online based on the operational mode of the IGCC plant. In one example embodiment, such weights Q and L may be adjusted in anticipation of an expected future change in the operational mode of the plant.

It should be appreciated that if one were to pursue the foregoing formulation as described so far, the tracking and optimization objectives could result in a conflict between these two objectives, which in a practical embodiment may not be desirable. For example, in a practical embodiment it may not be desirable to sacrifice a key object of the IGCC power plant, such as meeting the target value of the net electric power output of the IGCC plant, for the sake of optimizing (minimization or maximization) a performance metric of the IGCC power plant (e.g., minimization of oxygen consumption).

In accordance with aspects of the present invention, the control strategy is specifically configured to prioritize tracking performance over an optimization objective. For example, the optimization objective may not be performed if this would lead to a reduction of tracking performance, or at least not beyond an acceptable level. To achieve such a control strategy prioritization, a coordinate transformation process (e.g., orthogonal or quasi-orthogonal projection) is used. The following description is provided to explain aspects of the orthogonalization process.

Let us introduce the following notation for the sake of compactly representing respective discrete sequences of variables over a respective finite time horizon over which a prediction and control strategy may be formulated. In this notation, $y_i$ indicates respective sequences for the constraint, tracking and optimization outputs over the time horizon. The sequence u indicates a sequence of control inputs over the time horizon. The sequence r represents a reference profile (e.g., target values) over the time horizon.

$$\mathcal{Y}_i = \begin{bmatrix} Y_{i,k} \\ \vdots \\ Y_{i,k+np} \end{bmatrix}, i \in \{c, t, o\} \; \& \; \mathcal{U} = \begin{bmatrix} U_k \\ \vdots \\ U_{k+nc} \end{bmatrix} \; \& \; r = \begin{bmatrix} r_k \\ \vdots \\ r_{k+np} \end{bmatrix} \Rightarrow$$

$$\mathcal{Y}_t = \mathcal{Y}_t^f + S_{u,t} \mathcal{U}$$

$$\mathcal{Y}_o = \mathcal{Y}_o^f + S_{u,o} \mathcal{U}$$

$$\mathcal{Y}_c = \mathcal{Y}_o^f + S_{u,c} \mathcal{U}$$

The terms $y^f$ represent a free response (independent of control inputs u) of the system for the constraint, tracking and optimization outputs, respectively represented by variables c, t and o. The foregoing notation leads to the following modification of Eq. 4a:

$$\min_{\mathcal{U},s} \frac{1}{2}\underbrace{((r-\mathcal{Y}_t^f)-S_{u,t}\mathcal{U})^T Q((r-\mathcal{Y}_t^f)-S_{u,t}\mathcal{U})}_{} + \frac{1}{2}\mathcal{U}^T \mathcal{R} \mathcal{U} + \quad \text{Eq. 4b}$$
$$\underbrace{\mathcal{L}^T(\mathcal{Y}_o^f + S_{u,o}\mathcal{U}) + \frac{1}{2}s^T Q_s s + L_s^T s}_{}$$

In Eq. 4b, the expression under the dashed line represents the tracking functionality of the control strategy and the expression under the continuous line represents the optimization functionality of the control strategy. It will be appreciated by one skilled in the art that the tracking functionality corresponds to a quadratic form while the optimization functionality corresponds to a linear form. It will be appreciated by one skilled in the art that the tracking functionality having a quadratic form is consistent with a control strategy designed to meet the target value (e.g., positive or negative deviations would be symmetrically driven to zero). Similarly, the optimization functionality having a linear form is consistent with a control strategy designed to minimize or maximize a desired output (e.g., the desired output would be unidirectionally driven, either from a positive direction or from a negative direction, to reach the appropriate maximum (or minimum) value). In one example embodiment one may proceed to perform an orthogonal projection of the optimization outputs onto the tracking outputs by way of the following matrix transpose operation, where $Q_2$ is fully orthogonal to $S_{u,t}$ (subject to any practical numerical tolerances, as would be appreciated by one skilled in the art):

$$S_{u,t}^T = [Q_1 \; Q_2]\begin{bmatrix} R_1 \\ 0 \end{bmatrix} = Q_1 R_1 \Leftrightarrow \mathcal{U} = \mathcal{U}_1 + \mathcal{U}_2$$
$$\text{s.t. } S_{u,t} Q_2 = 0 \quad\quad = Q_1 Q_1^T \mathcal{U} + \underbrace{Q_2 Q_2^T \mathcal{U}}_{\Longleftrightarrow}$$

The expression under the solid line with twin arrows represents at least one excess degree of freedom in connection with control inputs fully decoupled (based on the orthogonal projection) with respect to the tracking strategy (control inputs that have no impact on tracking performance), and therefore can be effectively used for the optimization functionality of the control strategy. In one example embodiment one may proceed to perform a quasi-orthogonal projection (in lieu of a fully orthogonal projection) of the optimization outputs onto the tracking outputs by way of the following matrix transpose operation, where $Q_2$ is approximately orthogonal to $S_{u,t}$, and wherein the degree of quasi-orthogonality (e.g., degree of deviation from a fully orthogonal projection) is indicated by a variable $\epsilon$, which may be selected by the user:

$$S_{u,t}^T = [Q_1 \; Q_2]\begin{bmatrix} R_1 \\ \varepsilon \end{bmatrix} \approx Q_1 R_1 \Leftrightarrow \mathcal{U} = \mathcal{U}_1 + \mathcal{U}_2$$
$$\text{s.t. } S_{u,t} Q_2 \approx 0 \quad\quad = Q_1 Q_1^T \mathcal{U} + \underbrace{Q_2 Q_2^T \mathcal{U}}_{\Longleftrightarrow}$$

The expression under the solid line with twin arrows represents at least one excess degree of freedom in connection with control inputs not fully decoupled (based on the quasi-orthogonal projection) with respect to the tracking strategy (control inputs that may have some impact on tracking performance), but which can be effectively used for the optimization functionality of the control strategy without substantially affecting the tracking performance.

It will be appreciated from the foregoing that in accordance with aspects of the invention the control input u is made up of two linearly independent sets of control inputs: control inputs $u_1$, which are configured to impact tracking outputs, and control inputs $u_2$, which are configured to impact optimization outputs without affecting or substantially affecting the tracking outputs. That is, in an example situation where $u_2$ is equal to zero, would mean that there are no excess degrees of freedom available in the control inputs for performing the optimization objective functionality, which means that no optimization functionality is performed. One applies the foregoing projection (orthogonal or quasi-orthogonal projection) on Eq. 4b to obtain the following:

$$\min_{\mathcal{U},s} \frac{1}{2}((r-\mathcal{Y}_t^f)-S_{u,t}\mathcal{U})^T Q((r-\mathcal{Y}_t^f)-S_{u,t}\mathcal{U}) + \quad \text{Eq. 4c}$$
$$\frac{1}{2}\mathcal{U}^T \mathcal{R} \mathcal{U} + \underbrace{\mathcal{L}^T(\mathcal{Y}_o^f + S_{u,o} Q_2 Q_2^T \mathcal{U})}_{} + \frac{1}{2}s^T Q_s s + L_s^T s$$

In Eq. 4c, the expression under the continuous line once again represents the optimization functionality of the control strategy upon performing the orthogonal or quasi-orthogonal projection on the optimization outputs.

Eq. 4d below is derived by expanding and dropping constant terms that are independent of optimization variables U and s.

$$\min_{\mathcal{U},s} \frac{1}{2}\mathcal{U}^T S_{u,t}^T Q S_{u,t} \mathcal{U} - (r-\mathcal{Y}_t^f)^T Q S_{u,t} \mathcal{U} + \quad \text{Eq. 4d}$$
$$\frac{1}{2}\mathcal{U}^T \mathcal{R} \mathcal{U} + \mathcal{L}^T S_{u,o} Q_2 Q_2^T \mathcal{U} + \frac{1}{2}s^T Q_s s + L_s^T s$$

Eq. 4e below is derived by collecting quadratic and linear terms in Eq. 4d.

$$\min_{\mathcal{U},s} \frac{1}{2}\mathcal{U}^T H_u \mathcal{U} + c_u^T \mathcal{U} + \frac{1}{2}s^T Q_s s + L_s^T s \quad \text{Eq. 4e}$$

Eq. 4e will be recognized to yield the quadratic programming (QP) problem described in Eq. 6. In the example case of an orthogonal operation, this yields a control solution where the tracking objective is prioritized over the optimization objective so that in order to perform the optimization objective one should have at least one excess degree of freedom present in the control inputs after meeting the tracking objective. That is, only excess degrees of freedom in the control inputs that have no impact on the tracking objective will be used for performing the optimization objective. If no such excess degrees freedom is available in the control inputs, then the optimization objective will not be performed. The foregoing requirement is relaxed in the example case of a quasi-orthogonal projection since control inputs that may have some impact (the impact being dependent based on the degree of quasi-orthogonality indicated by variable c) on tracking performance, may be used for the optimization functionality of the control strategy without substantially affecting the tracking performance.

Figure 3:
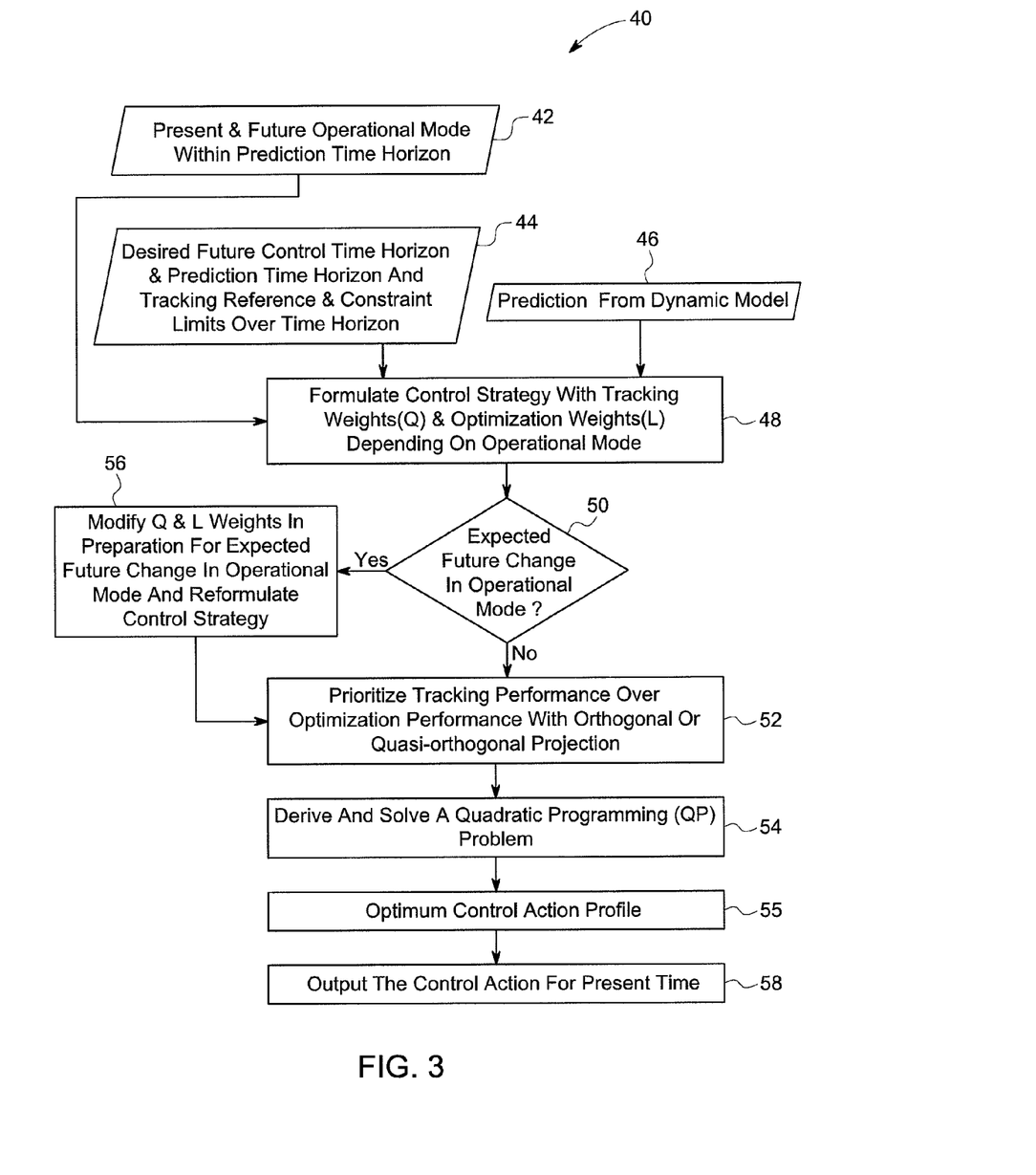
FIG. 3 is a flow chart illustrating example control actions in connection with a control strategy performed by a controller, as may be part of the control system shown in FIG. 1.

FIG. 3 is a flow chart illustrating example control actions in connection with a control strategy performed by controller 20

(FIG. 1). Blocks 42, 44 and 46 represent respective example inputs into controller 20. More particularly, block 42 represents inputs indicative of a present and future operational mode of the plant within a prediction time horizon. Block 44 represents inputs indicative of a respective control time horizon and a respective prediction time horizon. Thus, it will be appreciated that the control time horizon and the prediction time horizon need not be the same time horizon, although it could. Block 44 further represents inputs indicative of reference tracking settings and constraint limits over the control and prediction time horizons. Block 46 represents inputs indicative of a prediction over the prediction time horizon, as may be generated by dynamic model 18 (FIG. 1). It will be appreciated by one skilled in the art that the actions described so far correspond to Eqs. 4/4a and 5/5a.

Block 48 allows formulation of a control strategy with tracking weights (Q) and optimization weights linear (L), such as may be based on the operational mode of the plant. Decision block 50 may check whether there is an expected change in the operational mode of the plant over the time horizon. If there is no expected change in the operational mode of the plant over the time horizon, then one proceeds to block 52, which allows prioritization of tracking performance over optimization performance based on a coordinate transformation, (e.g., orthogonal or quasi-orthogonal projection). This action may be represented by Eqs. 4b-4.e. Block 54 allows derivation and computation of the control strategy, (e.g., optimum control action profile 55) embodying aspects of the present invention (e.g., where the tracking objective is prioritized over the optimization objective) by formulating and solving a QP problem, as represented by Eq. 6. Block 58 allows outputting the control action at a present time. If decision block 50 indicates that there is an expected change in the operational mode of the plant over the time horizon, then one proceeds to block 56, which allows modification of the respective optimization and tracking weights (Q and L) in preparation of the expected change in the operational mode of the plant and appropriate reformulation of the control strategy.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system for an integrated gasification combined cycle (IGCC) power generation plant, the system comprising:
    a sensor suite coupled to sense a plurality of signals indicative of plant parameters;
    an estimator coupled to receive at least some of the plant parameters sensed by the sensor suite and estimate at least a further plant parameter;
    a dynamic model coupled to the estimator and/or sensor suite to receive sensed and/or estimated plant parameters and generate a prediction of plant performance over a prediction time horizon;
    a controller coupled to the dynamic model to process the prediction of plant performance and determine a control strategy for the IGCC plant over a control time horizon subject to one or more constraints of the plant, wherein the control strategy comprises a control functionality to meet a tracking objective and further comprises a control functionality to meet an optimization objective, wherein the control strategy is configured to prioritize the tracking objective over the optimization objective based on a coordinate transformation; and
    a plurality of plant control knobs to be set in accordance with the determined control strategy to generate a sequence of coordinated multivariable control inputs configured to meet the tracking objective, and meet the optimization objective subject to the prioritization resulting from the coordinate transformation.

2. The control system of claim 1, wherein the coordinate transformation to prioritize the tracking objective over the optimization objective comprises a quasi-orthogonal projection, wherein a vector indicative of the optimization objective is projected on a subspace quasi-orthogonal to a vector indicative of the tracking objective.

3. The control system of claim 2, wherein the sequence of control inputs is determined based on an optimization algorithm configured to determine the control functionality to meet the tracking objective and further configured to determine the control functionality to meet the optimization objective subject to the prioritization resulting from the quasi-orthogonal projection, wherein the control functionality to meet the optimization objective is available when at least one excess degree freedom is present in the control inputs, and said at least one excess degree freedom is determined to have a predefined impact on the tracking objective based on a degree of quasi-orthogonality of the projection.

4. The control system of claim 1, wherein the coordinate transformation to prioritize the tracking objective over the optimization objective comprises an orthogonal projection, wherein a vector indicative of the optimization objective is projected on a subspace orthogonal to a vector indicative of the tracking objective.

5. The control system of claim 4, wherein the sequence of control inputs is determined based on an optimization algorithm configured to determine the control functionality to meet the tracking objective and further configured to determine the control functionality to meet the optimization objective subject to the prioritization resulting from the orthogonal projection, wherein the control functionality to meet the optimization objective is only available when at least one excess degree freedom is present in the control inputs after meeting the tracking objective, and said at least one excess degree freedom is determined to have no impact on the tracking objective.

6. The control system of claim 1, wherein the determination of the control strategy by the controller comprises a determination of the sequence of multivariable control inputs over the control time horizon.

7. The control system of claim 1, wherein the control strategy determined by the controller is dynamically adapted in response to at least one operational change affecting the plant over the control time horizon.

8. The control system of claim 7, wherein said at least one operational change affecting the plant is selected from the group consisting of the following: a change in an operational mode of the plant over the control time horizon, a change based on a transient load and/or a power throughput variation over the control time horizon, a change based on using a different type of fuel or fuel blend in a gasifier of the plant over the control time horizon, and a change due to a combination of at least two of said changes over the control time horizon.

9. The control system of claim 1, wherein the sequence of control inputs is determined based on an optimization algorithm including respective weights indicative of respective penalties in connection with the tracking objective and the optimization objective.

10. The control system of claim 9, wherein the respective weights are based on a present operational mode of the plant and further based on a future operational mode of plant over the prediction time horizon.

11. The control system of claim 10, wherein the respective weights are adjusted based on an expected future change in the operational mode of the plant over the prediction time horizon.

12. The control system of claim 1, wherein the dynamic model comprises a reduced-order dynamic model of a gasification section of the plant.

13. The control system of claim 1, wherein the estimator comprises an extended Kalman filter.

14. A method to control an integrated gasification combined cycle (IGCC) power generation plant, the method comprising:
sensing a plurality of signals indicative of plant parameters;
estimating at least a further plant parameter based on at least some of the sensed plant parameters;
generating a prediction of plant performance over a prediction time horizon based on sensed and/or estimated plant parameters;
processing the predicted plant performance to determine a control strategy over a control time horizon subject to one or more constraints of the plant;
defining in the control strategy a control functionality to meet a tracking objective;
defining in the control strategy a control functionality to meet an optimization objective;
performing a coordinate transformation to prioritize the tracking objective over the optimization objective; and
setting a plurality of plant control knobs in accordance with the determined control strategy to generate a sequence of coordinated multivariable control inputs configured to meet the tracking objective, and further configured to meet the optimization objective subject to the prioritization resulting from the coordinate transformation.

15. The control method of claim 14, wherein the coordinate transformation comprises performing a quasi-orthogonal projection, wherein a vector indicative of the optimization objective is projected on a subspace quasi-orthogonal to a vector indicative of the tracking objective.

16. The control method of claim 15, further comprising determining the sequence of control inputs based on an optimization algorithm configured to determine the control functionality to meet the tracking objective and further configured to determine the control functionality to meet the optimization objective subject to the prioritization resulting from the quasi-orthogonal projection, wherein the control functionality to meet the optimization objective available when at least one excess degree freedom is present in the control inputs, and said at least one excess degree freedom is determined to have a predefined impact on the tracking objective based on a degree of quasi-orthogonality of the projection.

17. The control method of claim 14, wherein the coordinate transformation comprises performing an orthogonal projection, wherein a vector indicative of the optimization objective is projected on a subspace orthogonal to a vector indicative of the tracking objective.

18. The control method of claim 17, further comprising determining the sequence of control inputs based on an optimization algorithm configured to determine the control functionality to meet the tracking objective and further configured to determine the control functionality to meet the optimization objective subject to the prioritization resulting from the orthogonal projection, wherein the control functionality to meet the optimization objective is only available when at least one excess degree freedom is present in the control inputs after meeting the tracking objective, and said at least one excess degree freedom is determined to have no impact on the tracking objective.

19. The control method of claim 14, wherein the processing of the control strategy comprises determining the sequence of multivariable control inputs over the control time horizon.

20. The control method of claim 14, further comprising dynamically adapting the control strategy in response to at least one operational change of the plant over the control time horizon.

21. The control method of claim 20, wherein said at least one operational change affecting the plant is selected from the group consisting of the following: a change in an operational mode of the plant over the control time horizon, a change based on a transient load and/or power throughput variation over the control time horizon, a change based on use of a different type of fuel or fuel blend in a gasifier of the plant over the control time horizon, and a change due to a combination of at least two of said changes over the control time horizon.

22. The control method of claim 14, further comprising determining the sequence of control inputs based on an optimization algorithm wherein the optimization algorithm includes respective weights indicative of respective penalties in connection with the tracking objective and the optimization objective.

23. The control method of claim 22, wherein the respective weights are based on a present operational mode of the plant and further based on a future operational mode of plant over the prediction time horizon.

24. The control method of claim 22, further comprising adjusting the respective weights based on an expected future change in the operational mode of the plant over the prediction time horizon.

25. An integrated gasification combined cycle (IGCC) power generation plant, comprising:
a control system comprising:
a sensor suite coupled to sense a plurality of signals indicative of plant parameters;
an estimator coupled to receive at least some plant parameters sensed by the sensor suite and estimate at least a further plant parameter;
a dynamic model of the plant coupled to the sensor suit and/or estimator to receive sensed and/or estimated plant parameters and generate a prediction of plant performance over a prediction time horizon subject to one or more constraints of the plant;
a controller coupled to the dynamic model to process the prediction of plant performance and determine a control strategy for the IGCC plant, wherein the control strategy comprises a control functionality to meet a tracking objective and further comprises a control functionality to meet an optimization objective, wherein the control strategy is configured to prioritize the tracking objective over the optimization objective based on a coordinate transformation comprising an orthogonal projection or a quasi-orthogonal projection; and
a plurality of plant control knobs to be set in accordance with the determined control strategy to generate a sequence of coordinated multivariable control inputs, and meet the optimization objective subject to the prioritization resulting from the orthogonal projection or the quasi-orthogonal projection.

* * * * *

UNITED STATES PATENT AND TRADEMARK OFFICE
CERTIFICATE OF CORRECTION

PATENT NO. : 8,417,361 B2
APPLICATION NO. : 13/053731
DATED : April 9, 2013
INVENTOR(S) : Kumar et al.

It is certified that error appears in the above-identified patent and that said Letters Patent is hereby corrected as shown below:

In the Specification

In Column 6, Line 66, delete "$\overline{x}^{k+j}, \overline{y}_{i,k+j}$" and insert -- $\overline{x}_{k+j}, \overline{y}_{i,k+j}$ --, therefor.

In Column 10, Line 62, delete "c)" and insert -- ε) --, therefor.

In the Claims

In Column 11, Line 26, delete "4b-4-e." and insert -- 4b-4e. --, therefor.

Signed and Sealed this
Fourth Day of June, 2013

Teresa Stanek Rea
*Acting Director of the United States Patent and Trademark Office*